(No Model.)
J. H. BYRAM.
STREET CLEANING CART.
No. 539,853. Patented May 28, 1895.
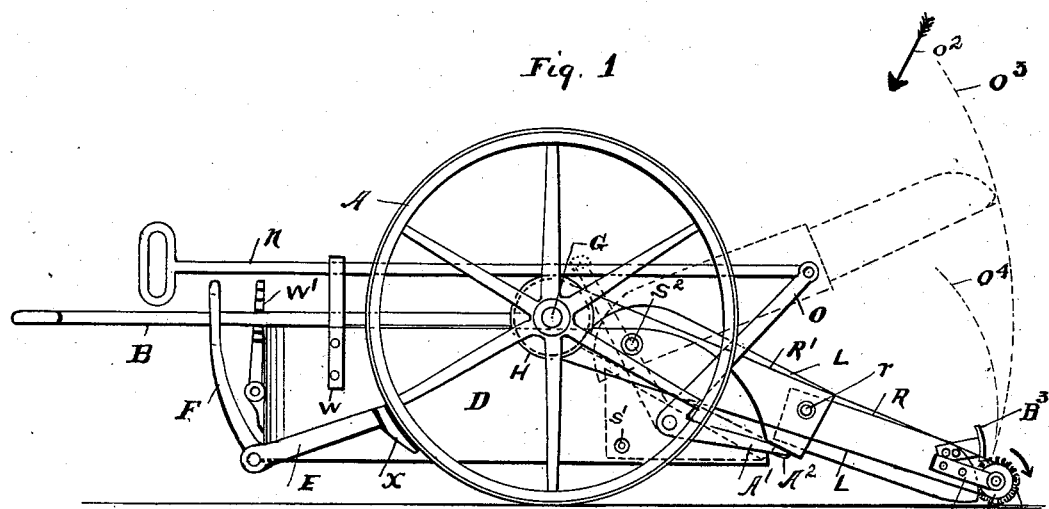
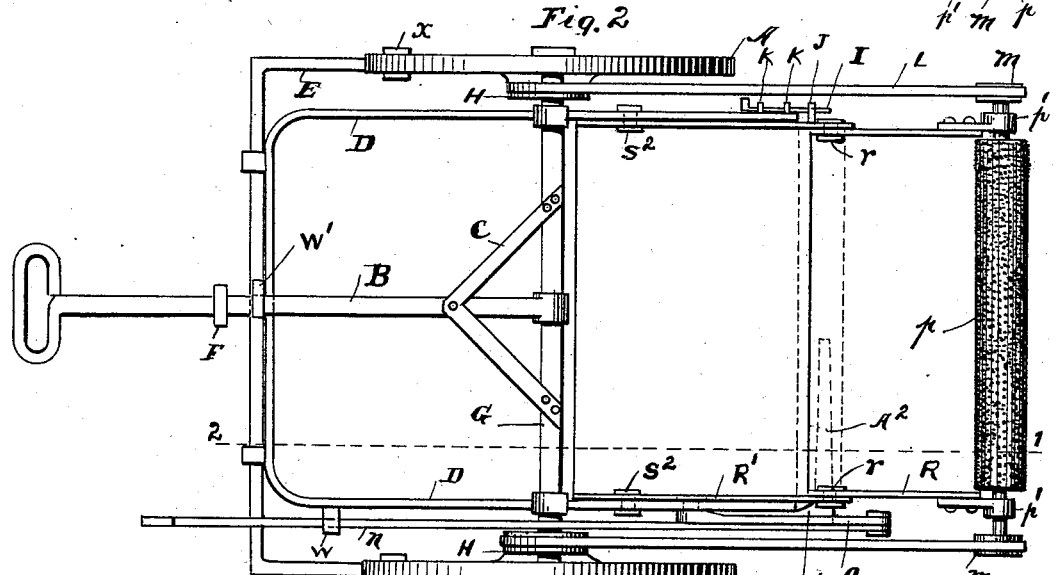
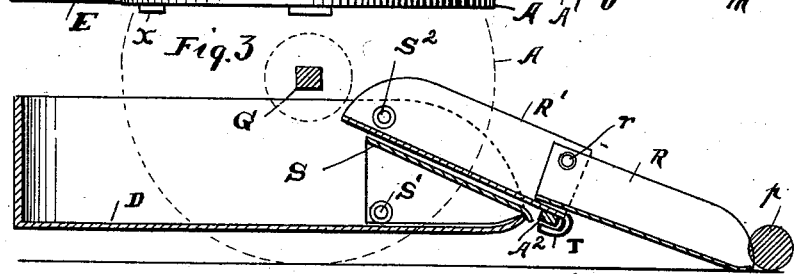
Witnesses
Inventor.

UNITED STATES PATENT OFFICE.

JOSEPH H. BYRAM, OF PHILADELPHIA, PENNSYLVANIA.

STREET-CLEANING CART.

SPECIFICATION forming part of Letters Patent No. 539,853, dated May 28, 1895.

Application filed June 23, 1894. Serial No. 515,457. (No model.)

*To all whom it may concern:*

Be it known that I, JOSEPH H. BYRAM, a citizen of the United States, residing in the city and county of Philadelphia and State of Pennsylvania, have invented certain new and useful Improvements in Street-Cleaning Carts, of which the following is a specification.

This invention relates more particularly to that class of carts adapted to cleaning asphaltum or similar pavements, which present a smooth surface to the action of the operative mechanism, but modifications may be made without departing from the spirit of the invention, which will adapt it to pavements having a more uneven surface.

The invention consists, first, in a cart having a suspended body, to which is attached a receiver composed of front and rear sections, and suitable mechanisms for elevating and depressing said receiver; second, in the combination with the suspended body of a cart of a receiver, to which is attached a hand lever for elevating said receiver, and a retaining door pivoted to the body of the cart to permit or prevent the egress of its contents; third, in the attachment to the suspended body of a cart of a receiver, composed of front and rear sections, a lever arranged to raise or depress said receiver, and a revolving brush wheel, operating to force the dirt or offal into the mouth of said receiver, and thence into the body of the cart; fourth, in the special construction of the receiver, and its combination with the suspended body of a cart, a retaining door attached to said body, means for raising and depressing said receiver, and a brush wheel arranged to operate in advance of the receiver, all as more fully hereinafter set forth.

The following description will enable those skilled in the art to which it appertains, to make and use my invention.

In the drawings, Figure 1 is a side elevation showing my cart when ready for use. The receiver is shown in its normal position by solid lines, and, when elevated, by dotted lines. Fig. 2 is a plan, and Fig. 3 is a side, view, partly in section, of the body of the cart and the receiver.

Like letters refer to like parts in each of the figures.

The two large wheels A are similar to those in ordinary use, but of somewhat larger diameter, to provide room for suspending the body of the cart D below the axle G in any suitable manner. Pivotally attached to the body D on the forward end thereof is the receiver, composed of the front part R and the rear part R', the two parts being hinged at r, so that the forward part R may be thrown up out of action when not in use.

I is a bolt held in place by the staples K K, attached to R' and engaging the staple J, attached to R for the purpose of holding the parts rigidly together when in use.

The revolving brush wheel p is located just in front of the mouth of the receiver, to which it is attached by the journal bearings p'. Just outside of these bearings are placed the pulleys M M, which are also driven by the belts L L, which are in turn driven by the pulleys H H, attached to the hub of the wheel A. Directly under the rear part of the receiver, is the retaining door S, which fits snugly down over the front of the body D to prevent the escape of any portion of the contents. This door is hinged to the body D at S', so as to allow the forward end to be raised upward sufficiently to enable the accumulated dirt or offal to pass out freely when it is desired to dump or clear the body of the cart of its contents. The lever O, for elevating the receiver, is also pivoted to the forward portion of the body D, and is operated from the rear of the cart by the long connecting rod N, supported by the guide W. Attached firmly to the axle G, and engaging with the rack W', is the hand rod B, for guiding and propelling the cart. An ordinary brake, F E X, is pivotally connected to the rear end of the body D, to restrain the movement of the wheels when on a descending grade.

It will be readily understood that when other than hand power is desirable, suitable attachments may be made without involving invention to animal or mechanical sources of power.

The operation of my improved cart is as follows: The brush wheel and the mouth of the receiver having been lowered into contact with the surface to be operated upon, the bolt I is forced into the staple J. The cart then is moved briskly forward, which causes the brush wheel to revolve, the under part of its periphery moving toward the mouth of the receiver. The effect of this motion of the brush is to force the particles of matter that may lie on the surface of the pavement onto the lower edge of the receiver, from which they are driven upward and backward by the succeeding particles until a sufficient quantity has been gathered, when a pull on the connection rod, attached to the lever O, elevates the forward part of the receiver, as shown in the dotted lines of the arc $O^3$, to a height sufficient to allow the contents to pass by gravitation into the body of the cart. These operations are repeated as often as may be necessary, until a load is secured. The bolt I is then withdrawn from the staple on the front section of the receiver, which is then elevated, describing the arc shown in the dotted lines $O^4$. The cart is then wheeled to the dumping ground, and the door S' being raised up and at the same time the forward end of the body having been depressed by manipulating the hand rod B, the contents will pass out by gravitation, providing a proper place has been selected for this part of the operation.

While for ordinary work, I consider the revolving brush wheel of great importance, occasions may arise, such as where large heaps of dirt are to be removed, when its use may be advantageously dispensed with.

Having thus fully described my invention and the manner in which the same is or may be carried into effect, what I claim, and desire to secure by Letters Patent, is—

1. In a cart, the combination of the suspended body, a receiver composed of two parts R and R', and mechanism for elevating and depressing said receiver, substantially as described.

2. In a cart, the combination of the suspended body, the receiver attached to said body, a hand lever for elevating said receiver, and a retaining door pivotally attached to said body, substantially as described.

3. In a cart, the combination of the suspended body, a receiver composed of the front and rear sections R and R', the lever O, and the revolving brush wheel, substantially as described.

4. In a cart, the combination of the suspended body, a retaining door attached to said body, a receiver composed of the front and rear sections R and R', the lever O, and a revolving brush wheel, substantially as described.

In testimony whereof I have signed this specification in the presence of two subscribing witnesses.

JOS. H. BYRAM.

Witnesses:
C. ERNEST FORSDICK,
J. C. VOGAN.